United States Patent [19]

Rekunyk

[11] Patent Number: 5,742,053
[45] Date of Patent: Apr. 21, 1998

[54] INFRARED GAS DETECTION METHOD AND APPARATUS

[76] Inventor: Horace Rekunyk, R.R. #1, P.O. Box #19 Site #5 NE, Calgary, Alberta, Canada

[21] Appl. No.: 770,365

[22] Filed: Nov. 29, 1996

[51] Int. Cl.$^6$ .................................................. G01N 21/00
[52] U.S. Cl. ........................................ 250/338.5; 250/253
[58] Field of Search ................................ 250/338.5, 253

[56] References Cited

U.S. PATENT DOCUMENTS

| | | | |
|---|---|---|---|
| 3,032,655 | 5/1962 | Romans | 250/338.5 X |
| 4,135,092 | 1/1979 | Milly | 250/338.5 X |
| 5,252,828 | 10/1993 | Kert et al. | 250/338.5 X |
| 5,602,543 | 2/1997 | Prata et al. | 250/338.5 X |

OTHER PUBLICATIONS

Author Unknown, GASPILS, Trade Journal Publication, 1983; 2 pages.
Byfield, Mike, Airborne Sniff Spots Pipeline Leaks, Calgary Sun, Apr. 12, 1994; 1 page.
Author Unknown, Laser–Thermo video Complex For Gas Leakage Detection, Moscow, USSR, date unknown but earlier than Nov. 29 1995; 1 page.
Durall, Mel; Looking for Trouble, Calgary Herald, Jun. 11, 1994; 2 pages.
Geiger and Prasad, Mid–infrared DIAL lidar for Petroleum Exploration and Pipeline Monitoring, S.P.I.E., 1994; 9 pages.
Berezovskii et al, Remote Laser Gas–Analyser for Ammonia, 1987: 4 pages.
Kaplan, Herbert, Using Laser Backscatter to Find Gas Leaks, Photonics Spectra, Jun. 1991; 3 pages.

*Primary Examiner*—David P. Porta
*Attorney, Agent, or Firm*—John Russell Uren

[57] ABSTRACT

Method and apparatus for determining the presence and identity of predetermined gases in the atmosphere such as would be found on a natural gas, natural gas liquid or oil pipeline if such pipeline was subject to leakage. An infrared transmitter and an infrared receiver are each mounted on a movable platform such as a fixed or rotary wing aircraft or on a vehicle. As the moving platform follows its predetermined assigned route, the presence of gases is determined by the infrared transmitter and receiver and at least one data acquisition module. The geographic position of the movable platform is determined so that the geographic location of the predetermined gases in the atmosphere is known.

23 Claims, 5 Drawing Sheets

INFRARED GAS DETECTION METHOD AND APPARATUS

INTRODUCTION

This invention relates to a method and apparatus for the measurement of hydrocarbon gases and hydrocarbon related toxic gases and vapors in ambient air. More particularly, this invention relates to a method and apparatus for the measurement of such gases by way of infrared technology combined with an airborne or moving ground based platform.

BACKGROUND OF THE INVENTION

The use of infrared technology to determine the presence or absence of hydrocarbons in ambient air is known. Such methods position the technology adjacent the area of interest and the receiver and transmitter are fixed in place at the location. Such location may, for example, be near a pipeline which is carrying such gases or in a storage area where such gases are stored for processing or where they may be transferred. The presence of such gases indicates leakage and steps can then be taken to remedy the situation.

The use of an airborne or ground based moving platform for mounting instrumentation is also known. Such instrumentation may utilize a locator device to determine the precise position of the platform relative to the ground and the instrumentation will provide information which is referenced to the known position. Typically, such instrumentation as cameras, thermal imaging and the like, have been used on airborne platforms.

Infrared technology has, however, not been used on an airborne or ground based moving instrument platform for pipeline surveillance and the use of such technology has many advantages. Presently, visual identification to identify pipeline leakage relies on an identification of dead vegetation to identify leak sources and is limited to the summer and areas with sufficient green vegetation during those periods. Infrared thermographic evaluations compare temperature differences between an oil or gas leak compared to the environmental surroundings. The thermographic technique requires relatively lengthy time periods to develop a thermographic image and does not work well in cold climates or in areas with a significant vegetation canopy. A flame ionization (FID) analyzer to evaluate ambient air for hydrocarbon gases/vapors utilizes relatively small samples. Thus, if the aircraft or ground based vehicle is moving quickly, the sample may not be representative and the lag time until the same enters the FID analyzer is lengthy. Likewise, the flame ionization instrument requires compressed hydrogen gas in order to operate. This presents a significant explosive and flammable hazard particularly where the aircraft is flying fast and low and where the ground based vehicle may be operated in urban areas.

SUMMARY OF THE INVENTION

According to one aspect of the invention, there is provided apparatus to measure predetermined gases present between an infrared transmitter and an infrared receiver mounted on a movable platform, means to measure the quantity of predetermined gases present in the area between said infrared transmitter and said infrared receiver and means to correlate the measurement of said predetermined gases present between said infrared receiver and said infrared transmitter and the geographic location of said movable platform.

According to a further aspect of the invention, there is provided a method of measuring predetermined gases present between an infrared transmitter and an infrared receiver, said method comprising emitting infrared radiation from said infrared transmitter, said infrared transmitter being located on a movable platform, receiving a portion of said emitted radiation in said receiver from said transmitter located remotely from said infrared transmitter, determining the quantity of said predetermined gases present between said infrared transmitter and said infrared receiver, and correlating the measurement of said predetermined gases by said receiver and transmitter to said geographic position of said movable platform.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
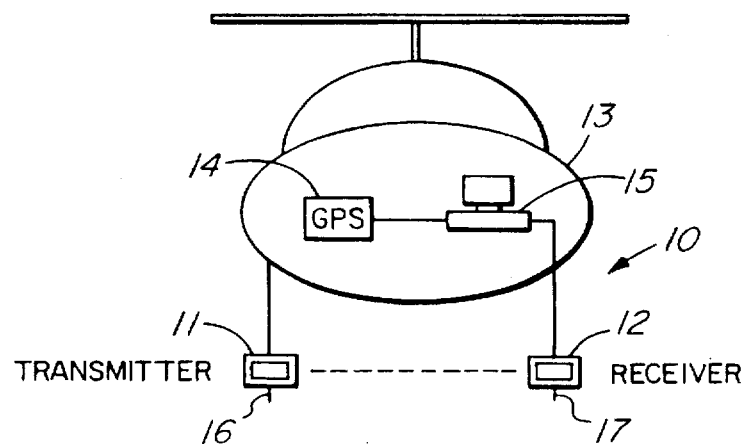
FIG. 1 is a diagrammatic illustration of an open path infrared detection system mounted on a movable airborne platform according to the invention.

The infrared sensor and locator system is generally illustrated at 10 in FIG. 1. It comprises an infrared transmitter 11 and an infrared receiver 12, each of the receiver 12 and transmitter 11 being mounted on an airborne platform conveniently in the form of a helicopter 13. The transmitter 11 and receiver 12 could, for example, be mounted on the skids 16, 17 of the helicopter 13. The transmitter 11 and receiver 12 are positioned below the body of the helicopter 13 and are located a certain distance apart in an open path configuration. The spectrum which results from the transmitter infrared radiation is gathered in the infrared receiver 12 and passes to the data acquisition system 15. The spectrum reflects the identity of gases present between the transmitter 11 and receiver 12 and, if the gases present are known, the quantity of such gases present may also be determined.

The helicopter 13 also has a global positioning system ("GPS") 14 operably connected to the data acquisition system. As information is obtained from the receiver 12, the quantity of gases is correlated with the position of the airborne platform 13. Thus, the position of any contaminating emissions measured by the receiver 12 will be quickly known and other units can be dispatched to that location either to repair or to shut in the emission.

Figure 3:
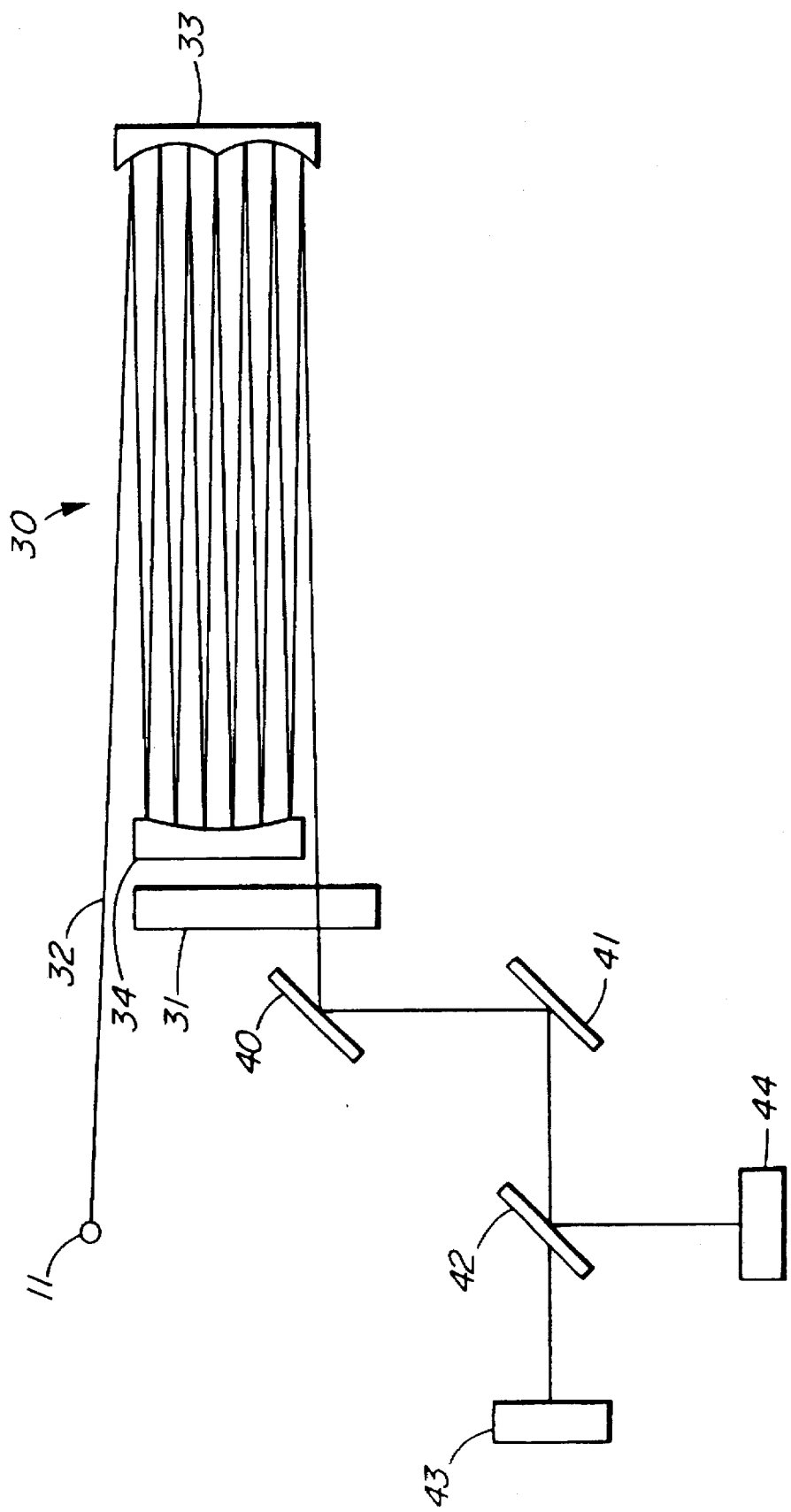
FIG. 3 is a diagrammatic view of the open path configuration utilising a White cell technique within a tube of the instrument, the White cell technique being used to increase the optical path of the infrared beam.

The optical path of the infrared beam is illustrated in FIG. 3. A "White cell" generally illustrated at 30 comprises a chopper wheel 31 which rotates to allow only a narrow beam 32 to pass therethrough as illustrated. The beam 32 is reflected between mirrors 33, 34 so as to increase the length of the open path within which the ambient air is analyzed. By increasing the length of the open path, the sensitivity of the instrument increases since the detection limit is inversely proportional to path length. Thus, if the infrared beam 32 is reflected through the air sample, conveniently forty (40) times, an approximate forty (40) fold improvement in sensitivity is obtained. Other multiples are available as may be desired by the user.

The infrared (IR) light 32 generated by IR source (not illustrated) enters the White cell 30. The IR light passes between the field mirror 34 and objective mirrors 33 many times, conveniently in the case of methane, forty (40) times. The White cell 30 is open to the sample air, which may or may not contain methane or other analyte gases. The IR light 32 exits the White cell 30 and passes through a four segment optical chopping wheel 31. Two segments of the wheel are opaque to all infrared radiation, one segment being an IR transparent cell containing methane and the fourth segment being an IR transparent cell containing nitrogen. After passing through the optical chopping wheel 31, the IR light 32 is split into two beams by an IR beam splitter 42. One of the beams passes through a 3.31 micrometer optical bandpass filter and the intensity of the transmitted beam is measured by detector 44. The second beam passes through a 3.89 micrometer optical bandpass filter and the intensity of the transmitted beam is measured by detector 43.

The methane concentration is proportional to the ratio of the intensity measured by detector 44 when the nitrogen segment of optical chopper 31 is in the light beam. The concentration of total hydrocarbon is proportional to the intensity of light measured by detector 44 to the intensity of light measured by detector 43, both taken when the nitrogen segment of optical chopper 31 is in the light beam.

Figure 2:
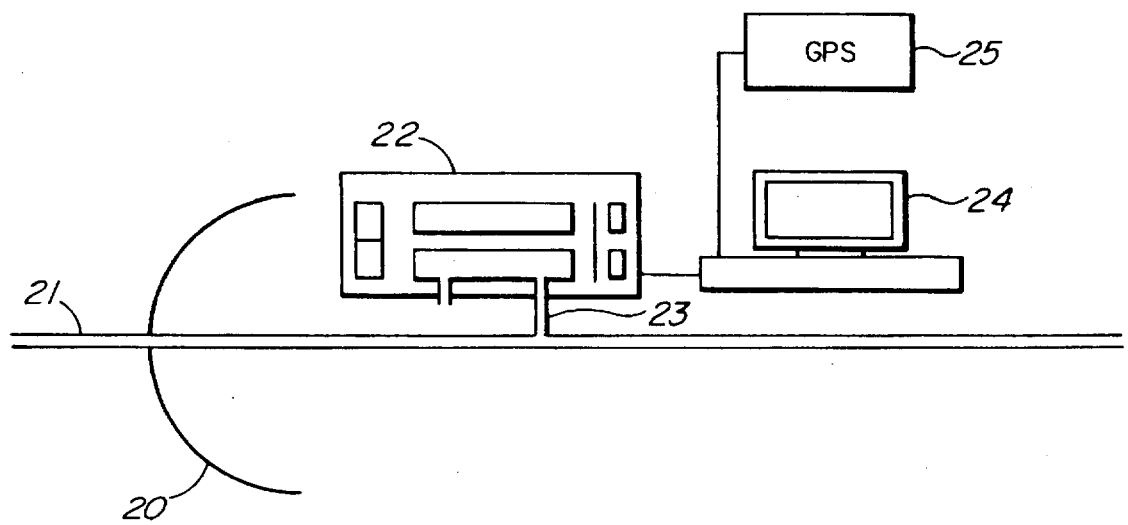
FIG. 2 is a diagrammatic view of a flow through infrared detection system according to a further aspect of the invention.

An alternative or "flow through" infrared detection systems is illustrated in FIG. 2. In this embodiment, the helicopter or airborne platform 20 includes a probe 21 which extends from the forward end of the helicopter 20. The probe 21 is typically of stainless steel and has an inside diameter of approximately ½ inch. The gas (not illustrated) enters the open end of the probe 21 and passes to a flow through infrared analyzer 22 through inlet 23. A data acquisition system 24 is operably connected to the infrared analyzer 22 and a GPS 25 is operably connected to the data acquisition system 24 so, as described earlier in connection with the open path infrared detection technique, the geographic location of the airborne platform 20 together with the aircraft speed, time of day and altitude will be known according to the data obtained by the data acquisition system 24 in the analyzer 22.

OPERATION

Figure 7:
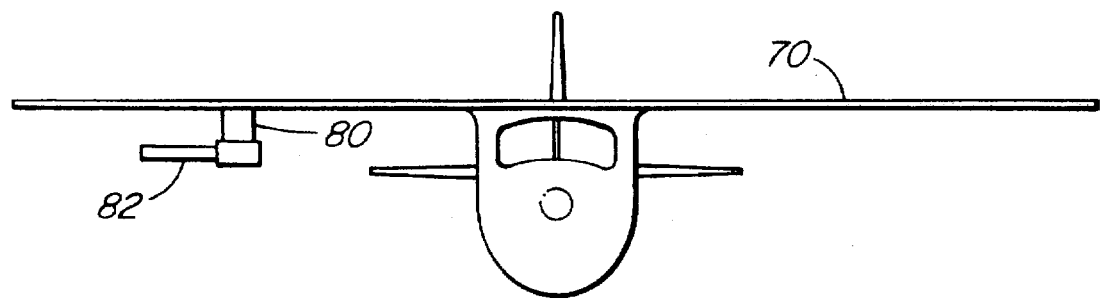
FIG. 7 illustrates the infrared detection system mounted on a fixed wing aircraft.

In operation, the helicopter 13 will be flown near an area where potential leakage of hydrocarbon gases may occur. The airborne platform, be it the helicopter 13 or a fixed wing aircraft 70 (FIG. 7) will typically be operated at a speed of 50 to 100 miles per hour and at an altitude of 50 to 100 feet. Such an area of operation would typically encompass an oil or natural gas or natural gas liquid pipeline and such gases would typically be hydrocarbon emissions due to leakage in the aforementioned pipelines.

The operation of the infrared transmitter 11 and infrared receiver 12 is initiated together with the data acquisition system and the global positioning system ("GPS") 15.

As the helicopter 13 proceeds down its assigned flying corridor, gases will be present in the atmosphere and the infrared detection system 10 will be programmed so as only to respond to those gases which it is desired to detect as has been described. When such gases are detected, the quantity of such gases will be determined and this amount will then be stored in the data acquisition system 15 and correlated with the geographic position of the instrument platform of the helicopter 13 as determined by the GPS 14.

When the helicopter 13 has reached the end of its route and has returned to its operating base, the information on the data acquisition system 15 will be downloaded and reviewed for any predetermined gases present, such as methane, and their amount. If such gases are detected and the quantity of such gases are of concern, remedial action can be taken to determine the source of the gas and how to reduce or terminate its presence.

Figure 6A:
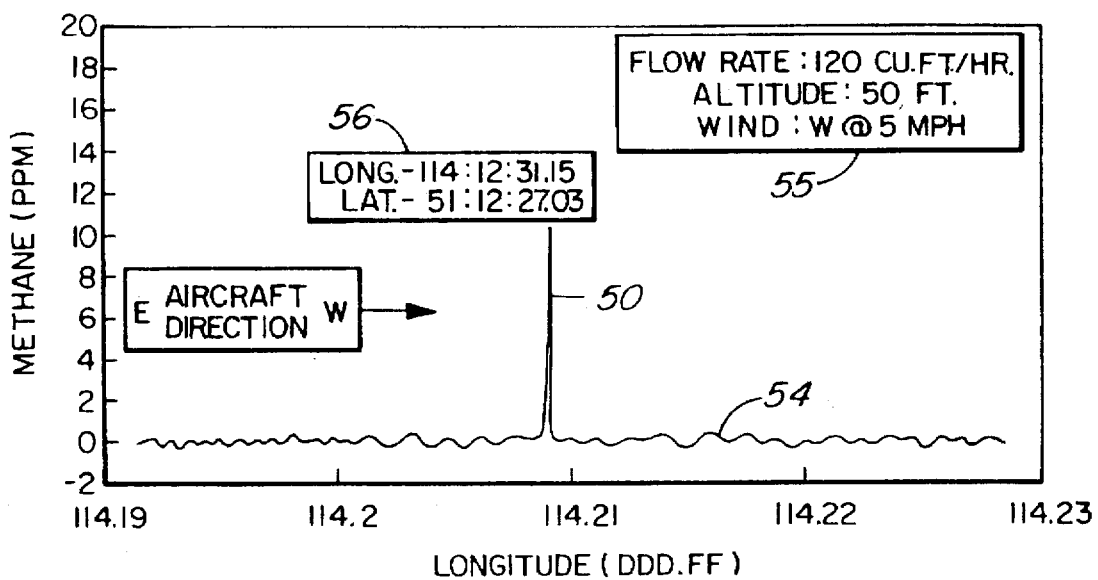
FIGS. 6A and 6B illustrate a methane "spike" obtained from the simulated operation of the movable airborne platform and the actual operation of the movable ground based platform, respectively, the two "spikes" representing an unusual condition at the geographical locations noted.
Figure 6B:
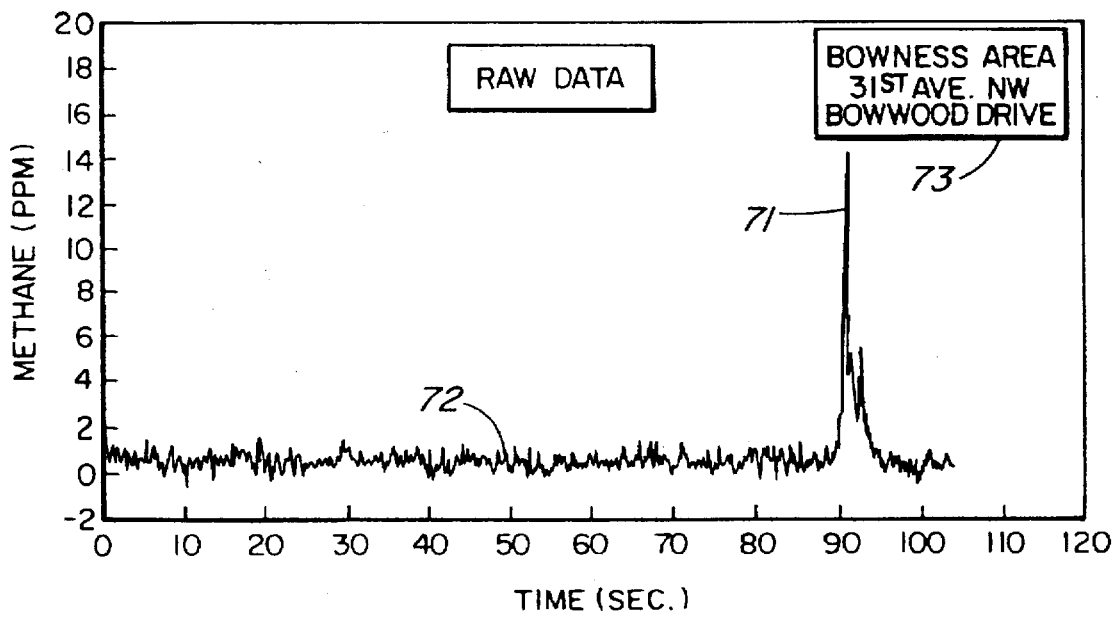

For example, and with reference to FIGS. 6A and 6B, spikes 50, 71 have been detected which clearly stand out from the usual concentration of methane in the atmosphere as shown generally at 54, 72, respectively, as degrees of longitude are transversed by the helicopter 13 as shown on the abscissa of the plot. The latitude and longitude of the location of the spike 50 is recorded by the GPS and illustrated at 56. The location of the spike 72 in FIG. 6B is shown at 73. The weather conditions under which the aircraft 13 was operating are also provided at 55 in FIG. 6A. Thus, remedial and service units can be deployed to the proper position to determine the cause of the spikes 50, 72. FIG. 6A was obtained in a simulated test using an open valve with an airborne helicopter using the infrared detection system. FIG. 6B was an actual occurrence and was obtained using a movable platform on a ground based vehicle.

Figure 5:
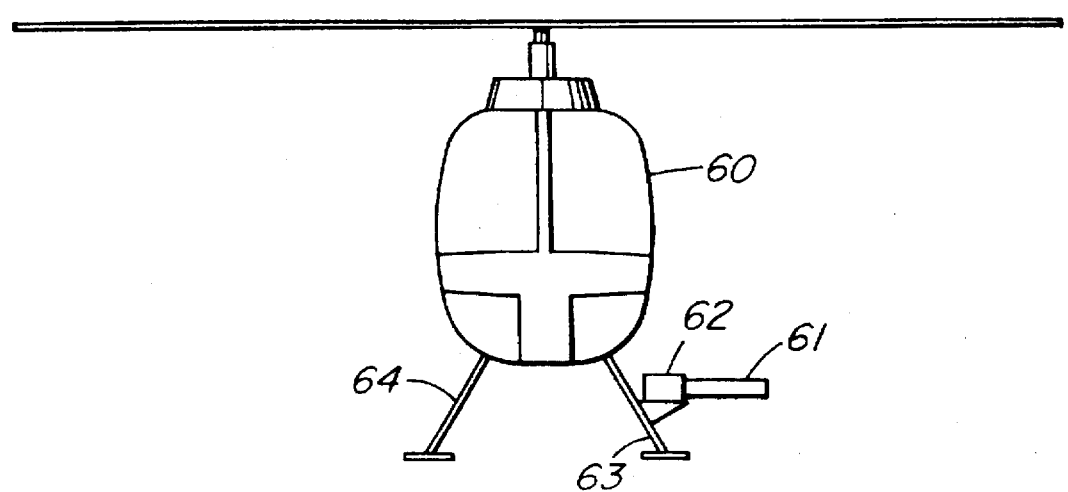
FIG. 5 is a diagrammatic view of an open path infrared detection system mounted on an movable airborne platform in a location different from the location illustrated in FIG. 1 and further utilising a single instrument body including a tube.

The "open path" analyzer 10 of FIGS. 1 and 5 can constantly analyze a large representative sample of the gases present in the atmosphere. A sample rate of approximately 3000 liters/second is contemplated. The "flow through" analyzer illustrated in FIG. 2 is a lower rate sampler, typically about 500 to 1000 cubic centimeters/min.

Many modifications will readily occur to those skilled in the art to which the invention relates. For example, rather than an airborne platform on a helicopter 13, the airborne platform 80 could be mounted on the fixed wing aircraft 72 (FIG. 7) with the instrument 81 attached thereto. Likewise, although the primary area of application will be in the evaluation of hydrocarbon gases/vapors, the technology is also applicable to detect other such gases as carbon dioxide, carbon monoxide, sulfur dioxide, ammonia or other analyte gases as the user may desire.

Figure 4:
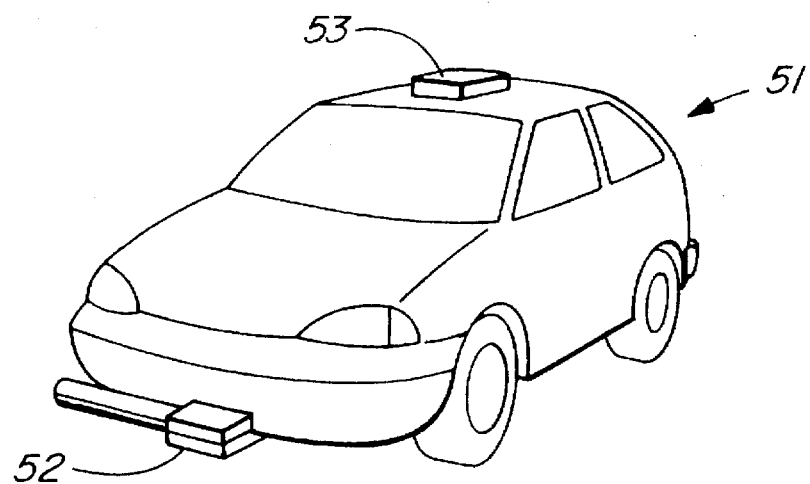
FIG. 4 is a diagrammatic view of the open path infrared detection system mounted on a ground based movable platform positioned on a vehicle.

A further embodiment of the invention is illustrated in FIG. 4 in which a ground based moving platform, namely a truck or vehicle generally illustrated at 51, has the infrared detection system generally illustrated at 52 mounted on the forward end of the vehicle 51. The GPS acquisition system 53 is located in the interior of the vehicle 51. The use of the GPS acquisition system 53 on the vehicle 51 is most useful only in rural and sparsely settled areas which, of course, is where many miles of pipelines and other surface facilities are located. However, if the area of interest is located in an urban area, the GPS system 53 suffers from accuracy problems due to the difficulty in obtaining line of sight between the plurality of satellites providing triangulated input parameters to the GPS system because of the presence of buildings, trees, tension lines and the like. For this reason, it may be desirable to use a dead reckoning technique under these conditions. The dead reckoning technique may typically use city maps, compass means, speedometer means and/or a measuring wheel and the like.

Figure 8:
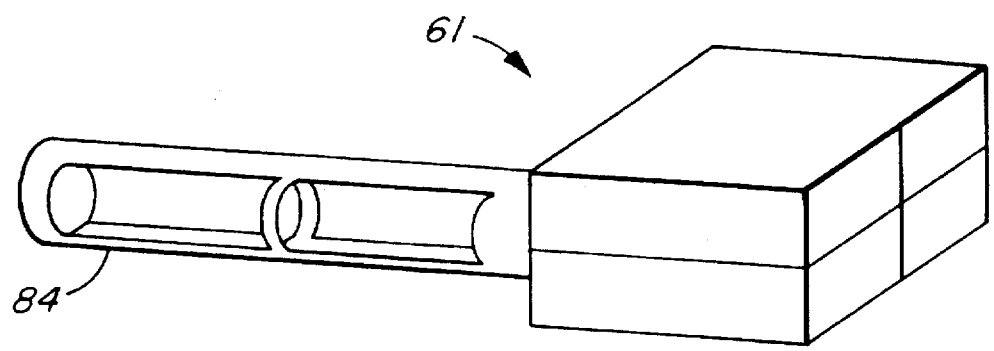
FIG. 8 illustrates an enlarged view of the instrument of FIG. 5.

Yet a further embodiment of the invention is illustrated in FIG. 5. An airborne platform, conveniently a helicopter 60, will have an infrared detection system 61 mounted on platform 62 similar to the embodiment of FIG. 1. However, whereas the receiver 12 and transmitter 11 of the infrared detection system 10 of FIG. 1 were mounted on opposite skids 16, 17 of the helicopter 13 and do not utilise a self-contained instrument with a tube 84 (FIG. 8), in the FIG. 5 embodiment the receiver (not illustrated) and transmitter (not illustrated) are both mounted on the same platform 62 in a single instrument 61 attached to skid 63. The skids 63, 64 of FIG. 5 and the skids 16, 17 of the helicopter 13 in FIG. 1 are typically hydraulically mounted so as to more softly impact the ground when landing. During that period, there is relative movement between the transmitter 16 and receiver 12 of the FIG. 1 embodiment since they were mounted on different skids 16, 17. By mounting both the receiver and transmitter of the infrared detection system 61 on the same skid 63 as shown in the FIG. 5 embodiment, such relative movement is removed which allows greater integrity in calibrating and setting the instrument up for operation.

Whereas the analysis of the data obtained by the data acquisition system has been previously described as being downloaded for processing and analysis, it would be desirable to transmit the data obtained directly to a processor located remotely from the data acquisition segment for real time processing and review by a remotely located operator. This would be desirable under certain conditions where analysis was required as early as possible. Alternatively, an operator on the aircraft or vehicle could identify anomalies concurrent with its acquisition While the White cell technique previously described covers principally methane, the measurement technique can be extended to other gases by changing the wavelengths of the optical bandpass filters in front of detectors 43, 44 (FIG. 3) and by changing the gases in the IR transparent segments of the optical chopping wheel 31.

Many other modifications will readily occur to those skilled in the art to which the invention relates and the specific embodiments described should be taken as illustrative of the invention only and not as limiting its scope as defined in accordance with the accompanying claims.

What is claimed is:

1. Apparatus to measure predetermined gases present between an infrared transmitter and an infrared receiver mounted on a movable platform, means to measure the quantity of predetermined gases present in the area between said infrared transmitter and said infrared receiver and means to correlate the measurement of said predetermined gases present between said infrared receiver and said infrared transmitter and the geographic location of said movable platform.

2. Apparatus as in claim 1 wherein said movable platform is an airborne platform.

3. Apparatus as in claim 1 wherein said movable platform is a ground based platform.

4. Apparatus as in claim 1 wherein said geographic location of said movable platform is determined by a global positioning system.

5. Apparatus as in claim 1 wherein said geographic location of said movable platform is determined by dead reckoning.

6. Apparatus as in claim 2 wherein said airborne platform is a helicopter.

7. Apparatus as in claim 2 wherein said airborne platform is a fixed wing aircraft.

8. Apparatus as in claim 1 wherein said predetermined gases are hydrocarbon gases or vapors.

9. Apparatus as in claim 8 wherein said hydrocarbon gases or vapors are methane gases.

10. Apparatus as in claim 1 wherein said predetermined gases comprise carbon dioxide, carbon monoxide, sulfur dioxide, and ammonia.

11. Apparatus as in claim 1 wherein said transmitter and said receiver are positioned in an open path configuration.

12. Method of measuring predetermined gases present between an infrared transmitter and an infrared receiver, said method comprising emitting infrared radiation from said infrared transmitter, said infrared transmitter being located on a movable platform, receiving a portion of said emitted radiation in said receiver from said transmitter located remotely from said infrared transmitter, determining the quantity of said predetermined gases present between said infrared transmitter and said infrared receiver, and correlating the measurement of said predetermined gases by said receiver and transmitter to said geographic position of said movable platform.

13. Method as in claim 12 wherein said receiver and said transmitter are positioned in an open path configuration within an instrument.

14. Method as in claim 13 wherein said predetermined gases are hydrocarbon gases.

15. Method as in claim 13 wherein said hydrocarbon gases are methane gases.

16. Method as in claim 13 wherein said predetermined gases comprise carbon dioxide, carbon monoxide, sulfur dioxide, and ammonia.

17. Method as in claim 13 wherein said quantity of said predetermined gases present is obtained by a first acquisition module.

18. Method as in claim 13 and further including a second acquisition module located remotely from said movable platform.

19. Method as in claim 12 wherein said geographic location of said instrument is obtained by a global positioning system.

20. Method as in claim 12 wherein said geographic location of said instrument is obtained by dead reckoning.

21. Apparatus as in claim 1 wherein said movable platform is mounted on a ground based vehicle.

22. Apparatus as in claim 11 wherein said open path configuration utilises a White cell.

23. Method as in claim 13 wherein said open path configuration is a White cell configuration.

* * * * *